United States Patent
Niibayashi et al.

(10) Patent No.: US 12,545,822 B2
(45) Date of Patent: Feb. 10, 2026

(54) WELDING FILM AND JOINED BODY

(71) Applicant: Resonac Corporation, Tokyo (JP)

(72) Inventors: Ryota Niibayashi, Tokyo (JP);
Nobuyuki Takahashi, Tokyo (JP);
Hayato Saito, Tokyo (JP); Kunihiro Kuroki, Tokyo (JP)

(73) Assignee: Resonac Corporation, Tokyo (JP)

( * ) Notice: Subject to any disclaimer, the term of this patent is extended or adjusted under 35 U.S.C. 154(b) by 140 days.

(21) Appl. No.: 18/276,510

(22) PCT Filed: Feb. 4, 2022

(86) PCT No.: PCT/JP2022/004352
§ 371 (c)(1),
(2) Date: Aug. 9, 2023

(87) PCT Pub. No.: WO2022/172863
PCT Pub. Date: Aug. 18, 2022

(65) Prior Publication Data
US 2024/0117228 A1    Apr. 11, 2024

(30) Foreign Application Priority Data
Feb. 10, 2021 (JP) .................. 2021-020100

(51) Int. Cl.
*C09J 171/10* (2006.01)
*C09J 7/35* (2018.01)

(52) U.S. Cl.
CPC .............. *C09J 171/10* (2013.01); *C09J 7/35* (2018.01); *C09J 2301/304* (2020.08); *C09J 2301/312* (2020.08)

(58) Field of Classification Search
CPC .......... B60B 17/0006; B60B 2360/102; B60B 2360/10; B60B 17/0003; C21D 6/002; C21D 6/005; C21D 6/008; C21D 9/0068; C21D 2211/003; C21D 2211/009; C21D 9/34; C22C 38/002; C22C 38/02; C22C 38/04; C22C 38/06; C22C 38/24; C22C 38/001; C22C 38/12; C22C 38/18
See application file for complete search history.

(56) References Cited

U.S. PATENT DOCUMENTS

| 4,546,160 A | * | 10/1985 | Brand ................ C08F 2/02 526/329.2 |
| 2003/0135011 A1 | * | 7/2003 | Goto ................ C08G 59/18 528/93 |
| 2013/0211028 A1 | * | 8/2013 | Shinike ................ C09J 11/04 526/307.5 |

FOREIGN PATENT DOCUMENTS

| CN | 111971343 A | 11/2020 |
| JP | 2007-277333 A | 10/2007 |
| JP | 2010-126694 A | 6/2010 |

(Continued)

OTHER PUBLICATIONS

Iwanami Physics and Chemistry Dictionary, Iwanami Shoten, 1979 (11 pages total).

(Continued)

*Primary Examiner* — Christopher W Raimund
(74) *Attorney, Agent, or Firm* — Sughrue Mion, PLLC

(57) ABSTRACT

A welding film includes a phenoxy resin, in which a z average molecular weight of the phenoxy resin is 70,000 or more, and a ratio [Mz/Mn] between the z average molecular weight and a number average molecular weight of the phenoxy resin is 5.0 or more.

19 Claims, 1 Drawing Sheet

(56) References Cited

FOREIGN PATENT DOCUMENTS

| JP | 2017-119779 A | 7/2017 |
|----|---------------|--------|
| JP | 2017-171802 A | 9/2017 |
| JP | 2019-147863 A | 9/2019 |
| JP | 2020-41100 A  | 3/2020 |
| JP | 2020-100728 A | 7/2020 |
| JP | 2020-125471 A | 8/2020 |
| TW | 202024165 A   | 7/2020 |

OTHER PUBLICATIONS

Karl-Friedrich Arndt et al., "Polymer Characterization," Carl Hanser, 1996 (30 pages total).

* cited by examiner

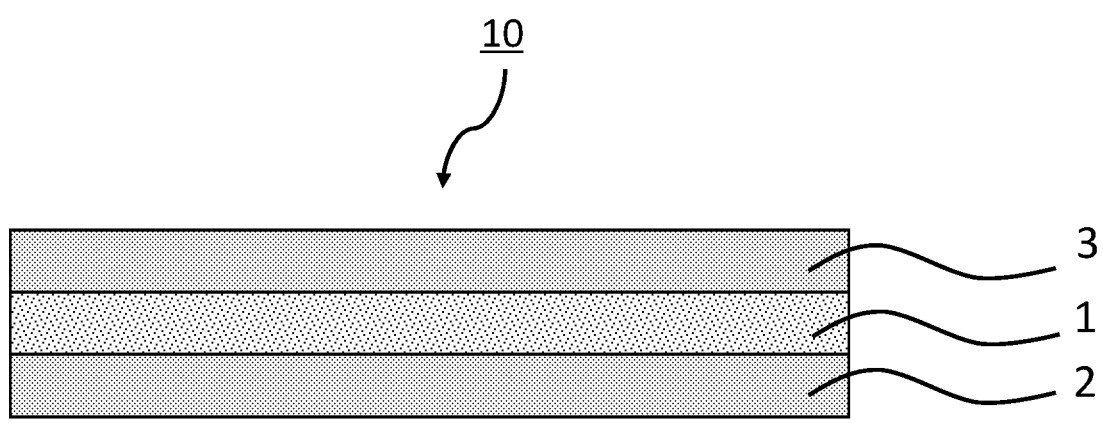

WELDING FILM AND JOINED BODY

CROSS REFERENCE TO RELATED APPLICATIONS

This application is a National Stage of International Application No. PCT/JP2022/004352 filed Feb. 4, 2022, claiming priority based on Japanese Patent Application No. 2021-020100 filed Feb. 10, 2021.

TECHNICAL FIELD

The present invention relates to a welding film suitably used to strongly weld the same kind or different kinds of resin materials, the same kind or different kinds of metals, and a metal and a resin.

BACKGROUND ART

In recent years, in joining resin parts together, metals together, and a resin part and a metal of, for example, automobile components, medical devices, and consumer electronics, use of joining methods other than conventional mechanical joining has been advanced from the viewpoints of product weight reduction, cost reduction, and the like. As means for joining resin or metal materials together other than mechanical joining methods, adhesive joining and welding such as ultrasonic welding, vibration welding, heat welding, hot air welding, induction welding, and injection welding is used, and welding is a joining method which is, in particular, highly simple and useful in productivity.

Conventionally, hot-melts, epoxy-based resins, reactive polyurethane-based resins, and the like have been used as welding materials. Hot-melts have been developed, with number-average molecular weights and weight-average molecular weights as indexes, and various blends and the like have been studied (for example, PTL 1).

CITATION LIST

Patent Literature

PTL 1: JP 2020-41100 A

SUMMARY OF INVENTION

Technical Problem

Hot-melts mentioned above have the problems of being impossible to obtain sufficient welding strength, requiring a special method for pretreatment and the like, and thus requiring additional work, and the like, and satisfying performance has not been obtained. In addition, when crosslinking reaction of epoxy-based resins or reactive polyurethane-based resins is used, there is the following problem: work time, water content, and the like are required to be precisely managed, and work is made complicated. In addition, from the viewpoint of convenience in work, adhesives are desired to be made into films; however, these epoxy-based resins or reactive polyurethane-based resins using crosslinking reaction are inferior in shape retainability and have the problem of being hardly made into films.

The present invention has been completed in view of such current conditions, and an object thereof is to provide a welding film excellent in welding strength and shape retainability, and a joined body using the welding film and a method of producing same.

Solution to Problem

The present inventors have, as a result of devoted examinations to solve the problems described above, found that a welding film including a phenoxy resin in which a z average molecular weight and a ratio [Mz/Mn] between the z average molecular weight and a number average molecular weight are certain values or more can solve the problems described above.

That is, the present disclosure relates to the following.

[1] A welding film including a phenoxy resin, in which a z average molecular weight of the phenoxy resin is 70,000 or more, and a ratio [Mz/Mn] between the z average molecular weight and a number average molecular weight of the phenoxy resin is 5.0 or more.

[2] The welding film according to [1] above, in which a thickness of the welding film is 1 to 1000 μm.

[3] The welding film according to [1] or [2] above, in which tensile shear strength obtained in a test in accordance with JIS K 6850:1999 when the welding film is welded between a first base material and a second base material is 10 MPa or more.

[4] A joined body obtained by welding the welding film according to any of [1] to [3] above between a first base material and a second base material.

[5] The joined body according to [4] above, in which the first base material and the second base material each include at least one kind selected from aluminum, iron, fiber reinforced plastic, glass, a ceramic, a polypropylene, a polycarbonate, a polymethyl methacrylate, a polyetherimide, a polyamide, and a polybutylene terephthalate.

[6] A method of producing the joined body according to [4] or [5] above, the method including welding a welding film between a first base material and a second base material by at least one method selected from the group consisting of heating, hot-pressing, ultrasonic welding, and high-frequency induction welding.

Advantageous Effects of Invention

According to the present invention, a welding film excellent in welding strength and shape retainability, and a joined body using the welding film and a method of producing same can be produced.

BRIEF DESCRIPTION OF DRAWINGS

The FIGURE is an illustrative view illustrating a configuration of a joined body in an embodiment of the present invention.

DESCRIPTION OF EMBODIMENTS

Hereinafter, the present invention will be described in detail with reference to an embodiment.

In the present specification, joining means coupling materials together, and adhesion and welding are narrower concepts thereof. Adhesion means putting two adherents (materials to be adhered) in a joined state via an organic material like tape and an adhesive (thermosetting resin and thermoplastic resin, for example).

Welding Film

A welding film of the present embodiment includes a phenoxy resin and is characterized in that a z average molecular weight of the phenoxy resin is 70,000 or more, and a ratio [Mz/Mn] between the z average molecular weight and a number average molecular weight of the phenoxy resin is 5.0 or more.

The z average molecular weight (Mz) of the phenoxy resin is 70,000 or more. When the Mz is less than 70,000, film formability may decrease and welding strength may decrease. The Mz is preferably 70,000 to 800,000, more preferably 70,000 to 600,000, further preferably 70,000 to 400,000, and even further preferably 80,000 to 250,000 from the viewpoints of improving film formability and enhancing welding strength.

Incidentally, in the present specification, the Mz and Mn and Mw described later can be measured by a method using a device that separates molecules by size with a column having fine pores and specifically can be measured by the method described in the examples.

Since the Mz of the phenoxy resin is 70,000 or more, it is inferred that a resin forming three-dimensional branches and a linear resin are moderately mixed in the phenoxy resin. Consequently, film formability of the phenoxy resin is improved, and a welding film including the phenoxy resin is thus made excellent in welding strength. In addition, storage stability and repairability of the welding film become excellent.

The phenoxy resin may include a linear resin with a relatively low molecular weight. Inclusion of a low molecular weight resin can enhance wettability of the welding film to adherents.

The number average molecular weight (Mn) of the phenoxy resin is preferably 6,000 to 30,000, more preferably 6,000 to 25,000, furtherer preferably 6,000 to 20,000, and even further preferably 7,000 to 20,000. When the Mn of the phenoxy resin falls within the above range, a rein forming three-dimensional branches is present to some extent, and a resin with a relatively low molecular weight is easily included, and thus welding strength and wettability to adherents become excellent.

The ratio [Mz/Mn] between the Mz and the Mn is 5.0 or more. When the ratio [Mz/Mn] is less than 5.0, film formability may decrease, and welding strength may decrease. From the viewpoints of improving film formability and enhancing welding strength, the ratio [Mz/Mn] is preferably 5.0 to 200.0, more preferably 5.0 to 100.0, further preferably 5.0 to 50.0, even further preferably 5.0 to 35.0, even further preferably 5.0 to 30.0, and even further preferably 5.0 to 24.0.

A weight average molecular weight (Mw) of the phenoxy resin is preferably 10,000 to 500,000, more preferably 20,000 to 300,000, further preferably 25,000 to 150,000, even further preferably 25,000 to 120,000, and even further preferably 30,000 to 120,000. When the Mw of the phenoxy resin falls within the above range, a rein forming three-dimensional branches is present to some extent, and a resin with a relatively low molecular weight is easily included, and thus film formability and welding strength become excellent.

While the phenoxy resin used in the present invention is not particularly limited as long as the Mz and the ratio [Mz/Mn] are equal to or more than the above-described ranges, respectively, examples thereof include a resin obtained by reacting a bifunctional epoxy compound and a bifunctional hydroxy group-containing compound in the presence of a catalyst.

Examples of the bifunctional epoxy compound include aromatic epoxy resins such as a bisphenol A-type epoxy resin, a bisphenol F-type epoxy resin, a bisphenol S-type epoxy resin, a biphenol-type epoxy resin, and a naphthalene-type bifunctional epoxy resin; and aliphatic epoxy resins such as 1,6-hexanediol diglycidyl ether. One kind thereof may be used singly, or two or more kinds thereof may be used in combination.

A bisphenol A-type epoxy resin is particularly preferable, and the molecular weight thereof is preferably 250 to 6,000, more preferably 300 to 6,000, and further preferably 700 to 5,000. When the molecular weight falls within this range, film formability is improved.

Examples of the bifunctional hydroxy group-containing compound include phenols such as bisphenol A, bisphenol F, bisphenol S, and biphenol; and aliphatic glycols such as ethylene glycol, propylene glycol, and diethylene glycol. Among these, from the viewpoints of costs, adhesiveness, and water resistance, bisphenol A and bisphenol S are preferable, and bisphenol S is particularly preferable. One kind thereof may be used singly, or two or more kinds thereof may be used in combination.

A blending amount of the bifunctional hydroxy group-containing compound is preferably 0.4 to 1.2 equivalents and more preferably 0.5 to 1.0 equivalents based on 1.0 equivalent of the bifunctional epoxy resin. When the blending amount of the bifunctional hydroxy group-containing compound falls within the above range, film formability is improved. In addition, the Mz and the ratio [Mz/Mn] of the phenoxy resin are easily adjusted to be the above-described values or more, respectively.

Tertiary amines such as triethyl amine and 2,4,6-tris (dimethylaminomethyl)phenol; and phosphorus-based compounds such as triphenylphosphine are suitably used as the catalyst, for example. Among these, from the viewpoint of stability, triphenylphosphine is preferable.

An amount used of the catalyst is not particularly limited but is preferably 0.01 to 10.00 parts by mass, more preferably 0.10 to 1.00 parts by mass, and further preferably 0.15 to 0.50 parts by mass based on 100 parts by mass of the bifunctional epoxy compound and the bifunctional hydroxy group-containing compound in total.

Reaction between the bifunctional epoxy compound and the bifunctional hydroxy group-containing compound is preferably carried out at 50° C. to 200° C.

In the present invention, a bifunctional carboxy compound and a bifunctional thiol compound may be used besides the bifunctional hydroxy group-containing compound. The bifunctional carboxy compound may be a compound having two carboxy groups within a molecule, and examples thereof include aromatic dicarboxylic acids such as terephthalic acid and isophthalic acid; and aliphatic dicarboxylic acids such as oxalic acid, succinic acid, malonic acid, glutaric acid, adipic acid, sebacic acid, maleic acid, and fumaric acid. The bifunctional thiol compound may be a compound having two mercapto groups within a molecule, and examples thereof include a bifunctional secondary thiol compound manufactured by Showa Denko K.K., Karenz MT (registered trademark) BD1: 1,4-bis(3-mercaptobutylyloxy)butane.

Method of Producing Welding Film

While a method of producing a welding film in the present embodiment is not particularly limited, examples thereof include a method in which a welding film including the phenoxy resin is obtained through thermocompression of a resin composition obtained by mixing and heating the bifunctional epoxy resin and the bifunctional hydroxy group-containing compound, or through thermocompression of a resin composition with a solid content of 95% by mass or more obtained by dissolving the bifunctional epoxy resin and the bifunctional hydroxy group-containing compound in a solvent and removing the solvent from the obtained mixture if needed.

According to the production method described above, a welding film including the phenoxy resin can be produced in a simple manner. In addition, the Mz and the ratio [Mz/Mn] of the phenoxy resin are easily adjusted to be the above-described values or more, respectively.

Incidentally, the "solid content" herein refers to a component in the composition excluding volatile components such as solvents.

When a catalyst is used, the catalyst may be added to a solvent simultaneously with the bifunctional epoxy resin and the bifunctional hydroxy group-containing compound or may be added after the bifunctional epoxy resin and the bifunctional hydroxy group-containing compound are dissolved in a solvent.

Methyl ethyl ketone, cyclohexanone, toluene, xylene, acetone, and the like are preferable as the solvent.

Examples of a method of thermally compressing the resin composition include a compression method with a heated press (hot press) or the like.

A temperature of the hot press is preferably 120° C. to 250° C., more preferably 130° C. to 200° C., and further preferably 140° C. to 180° C.

In addition, a compression time in compressing the resin composition with a hot press is preferably 0.5 to 4 hours, more preferably 0.5 to 3 hours, and further preferably 0.5 to 2 hours.

A thickness of the welding film of the present embodiment is preferably 1 to 1000 μm, more preferably 10 to 800 μm, and further preferably 20 to 500 μm.

Tensile shear strength obtained in a test in accordance with JIS K 6850:1999 when the welding film of the present embodiment is welded between a first base material and a second base material is preferably 10 MPa or more and more preferably 13 MPa or more.

Specifically, the tensile shear strength can be measured by the method described in the examples.

Joined Body

The FIGURE is an illustrative view illustrating a configuration of a joined body in an embodiment (present embodiment) of the present invention. As illustrated in the FIGURE, a joined body 10 of the present embodiment is obtained by welding a welding film 1 between a first base material 2 and a second base material 3. The welding method includes at least one method selected from the group consisting of heating, hot-pressing, ultrasonic welding, and high-frequency induction welding. Among these, hot-pressing, ultrasonic welding, and high-frequency induction welding are preferable.

It is preferable that the first base material and the second base material each include at least one kind selected from aluminum, iron, fiber reinforced plastic (FRP), glass, a ceramic, a polypropylene, a polycarbonate, a polymethyl methacrylate, a polyetherimide, a polyamide, and a polybutylene terephthalate, and it is more preferable that the first base material and the second base material each include at least one kind selected from aluminum, iron, a polycarbonate, and a polybutylene terephthalate.

The first base material and the second base material may be made from the same material or made from materials different from each other.

It is preferable that surfaces of the first base material and the second base material be both subjected to a pretreatment for the purpose of removal of contaminations on the surfaces and/or anchor effect.

Examples of the pretreatment include a degreasing treatment, an UV ozone treatment, a blasting treatment, a polishing treatment, a plasma treatment, a corona discharge treatment, a laser treatment, an etching treatment, and a flame treatment.

A pretreatment for cleaning the surface of the base material or a pretreatment imparting irregularities on the surface is preferable as the pretreatment. Specifically, when the base material includes aluminum, glass, a ceramic, or iron, at least one kind selected from the group consisting of a degreasing treatment, an UV ozone treatment, a blasting treatment, a polishing treatment, a plasma treatment, and an etching treatment is preferable, and when the base material includes an FRP, a polypropylene, a polycarbonate, a polymethyl methacrylate, a polyetherimide, a polyamide, or a polybutylene terephthalate, at least one kind selected from the group consisting of a degreasing treatment, an UV ozone treatment, a blasting treatment, a polishing treatment, a plasma treatment, and a corona discharge treatment is preferable.

One kind of the pretreatment may be carried out alone, or two or more kinds thereof may be carried out. Known methods can be used as specific methods for these pretreatments.

Usually, hydroxy groups derived from a resin or a reinforcing material are considered to be present on the surface of an FRP, and hydroxy groups are considered to be intrinsically present on glass and ceramic surfaces; meanwhile, hydroxy groups are newly generated through the pretreatment, and the amount of hydroxy groups on the surface of the base material can be increased.

The degreasing treatment is a method for dissolving dirt such as fat and oil on the base material surface with, for example, an organic solvent such as acetone and toluene to remove dirt.

The UV ozone treatment is a method for cleaning and modifying a surface by the energy of ultraviolet rays with short wavelengths emitted from a low-pressure mercury lamp and the power of ozone ($O_3$) generated thereby. In a case of glass, the UV ozone treatment is one surface cleaning method for removing organic impurities on a surface. In general, a cleaned surface modifying device using a low-pressure mercury lamp is referred to as an "UV ozone cleaner," an "UV cleaning device," an "ultraviolet surface modifying device," and the like.

Examples of the blasting treatment include a wet blasting treatment, a shot blasting treatment, and a sandblasting treatment. Among these, a wet blasting treatment provides a surface finer than that obtained by a dry blasting treatment and is thus preferable.

Examples of the polishing treatment include buff polishing using polishing cloth, roll polishing using polishing paper (sandpaper), and electropolishing.

The plasma treatment creates a plasma beam with a high-voltage power supply and a rod and causes the plasma beam to impinge on a material surface to excite molecules and functionalize the molecules, and includes an atmospheric pressure plasma treatment method capable of imparting hydroxy groups or polar groups onto a material surface, for example.

The corona discharge treatment includes a method applied for surface modification of a polymer film and is a method for generating hydroxy groups or polar groups on a surface, beginning at radicals generated by cutting, with electrons emitted from an electrode, polymer main chains or side chains on a polymer surface layer.

The laser treatment is a technique improving surface characteristics by rapidly heating only a surface of a base material with laser irradiation and cooling same, and is an effective method for surface coarsening. Known laser treatment techniques can be used.

Examples of the etching treatment include chemical etching treatments such as an alkali method, a phosphoric acid-sulfuric acid method, a fluoride method, a chromic acid-sulfuric acid method, and a salt iron method; and electrochemical etching treatments such as an electroetching method.

The flame treatment is a method combusting a mixed gas of a combustion gas and air to generate plasma from oxygen in the air and trying to make a surface hydrophilic by imparting the oxygen plasma to an object to be treated. Known flame treatment techniques can be used.

EXAMPLES

Next, the present invention will be specifically described with reference to examples; however, the present invention is not limited to the examples at all.

Production Example 1

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 1.0 equivalent (12.5 g) of bisphenol S (molecular weight: 250), 0.8 g of triphenylphosphine, and 400 g of methyl ethyl ketone, and the temperature was increased to 100° C. while stirring in a nitrogen atmosphere. Completion of dissolution was visually confirmed, and a resin composition with a solid content of 35% by mass was obtained after cooling to 40° C. The solvent was removed therefrom to obtain resin composition (EP-1) with a solid content of 100% by mass.

Production Example 2

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 0.8 equivalents (10.0 g) of bisphenol S (molecular weight: 250), 0.8 g of triphenylphosphine, and 397 g of methyl ethyl ketone, and the temperature was increased to 100° C. while stirring in a nitrogen atmosphere. Completion of dissolution was visually confirmed, and a resin composition with a solid content of 35% by mass was obtained after cooling to 40° C. The solvent was removed therefrom to obtain resin composition (EP-2) with a solid content of 100% by mass.

Production Example 3

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 0.5 equivalents (6.3 g) of bisphenol S (molecular weight: 250), 0.8 g of triphenylphosphine, and 390 g of methyl ethyl ketone, and the temperature was increased to 100° C. while stirring in a nitrogen atmosphere. Completion of dissolution was visually confirmed, and a resin composition with a solid content of 35% by mass was obtained after cooling to 40° C. The solvent was removed therefrom to obtain resin composition (EP-3) with a solid content of 100% by mass.

Production Example 4

Into a reaction device equipped with a stirrer, a reflux condenser, a gas introduction tube, and a thermometer, were put 1.0 equivalent (270 g) of jER (registered trademark) 1001 (manufactured by Mitsubishi Chemical Corporation, bisphenol A-type epoxy resin, molecular weight: about 900), 0.95 equivalents (71.3 g) of bisphenol S (molecular weight: 250), 0.8 g of triphenylphosphine, and 515 g of methyl ethyl ketone, and the temperature was increased to 100° C. while stirring in a nitrogen atmosphere. Completion of dissolution was visually confirmed, and a resin composition with a solid content of 35% by mass was obtained after cooling to 40° C. The solvent was removed therefrom to obtain resin composition (EP-4) with a solid content of 100% by mass.

Production Example 5

Into a reaction device equipped with a stirrer, a reflux condenser, a gas introduction tube, and a thermometer, were put 1.0 equivalent (189 g) of EOMIK R140P (manufactured by Mitsui Chemicals, Inc., bisphenol A-type epoxy resin, molecular weight: about 378), 0.95 equivalents (119 g) of bisphenol S (molecular weight: 250), and 0.8 g of triphenylphosphine, and the temperature was increased to 100° C. while stirring in a nitrogen atmosphere. Completion of dissolution was visually confirmed to obtain resin composition (EP-5) with a solid content of 100% by mass.

Production Example 6

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 0.25 equivalents (3.1 g) of bisphenol S (molecular weight: 250), 0.8 g of triphenylphosphine, and 390 g of methyl ethyl ketone, and the temperature was increased to 100° C. while stirring in a nitrogen atmosphere. Completion of dissolution was visually confirmed, and a resin composition with a solid content of 35% by mass was obtained after cooling to 40° C. The solvent was removed therefrom to obtain resin composition (EP-6) with a solid content of 100% by mass.

Production Example 7

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 0.95 equivalents (11.8 g) of bisphenol S (molecular weight: 250), 0.8 g of triphenylphosphine, and 198 g of cyclohexanone, and the temperature was increased to 170° C. in a nitrogen atmosphere to cause a reaction. After reaction of 6.5 hours, disappearance of the peak originating from bisphenol S was confirmed by gel permeation chromatography (GPC), and the reaction was terminated to obtain a phenoxy resin with a solid content of 52% by mass. The solvent was removed therefrom to obtain phenoxy resin (EP-7) with a solid content of 100% by mass.

Production Example 8

Into a reaction device equipped with a stirrer, a reflux condenser, a gas introduction tube, and a thermometer, were put 1.0 equivalent (189 g) of EOMIK R140P (manufactured by Mitsui Chemicals, Inc., bisphenol A-type epoxy resin, molecular weight: about 378), 0.95 equivalents (119 g) of bisphenol S (molecular weight: 250), 0.8 g of triphenylphosphine, and 1232 g of cyclohexanone, and the temperature was increased to 170° C. in a nitrogen atmosphere to cause a reaction. After reaction of 4 hours, disappearance of the peak originating from bisphenol S was confirmed by GPC, and the reaction was terminated to obtain a phenoxy resin with a solid content of 25% by mass. The solvent was removed therefrom to obtain phenoxy resin (EP-8) with a solid content of 100% by mass.

Production Example 9

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 0.95 equivalents (11.8 g) of bisphenol S (molecular weight: 250), 0.8 g of triphenylphosphine, and 400 g of cyclohexanone, and the temperature was increased to 170° C. in a nitrogen atmosphere to cause a reaction. After reaction of 6.5 hours, disappearance of the peak originating from bisphenol S was confirmed by GPC, and the reaction was terminated to obtain a phenoxy resin with a solid content of 35% by mass. The solvent was removed therefrom to obtain phenoxy resin (EP-9) with a solid content of 100% by mass.

Production Example 10

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 0.95 equivalents (11.8 g) of bisphenol S (molecular weight: 250), 7.2 g of triphenylphosphine, and 200 g of cyclohexanone, and the temperature was increased to 170° C. in a nitrogen atmosphere to cause a reaction. After reaction of 4 hours, disappearance of the peak originating from bisphenol S was confirmed by GPC, and the reaction was terminated to obtain a phenoxy resin with a solid content of 52% by mass. The solvent was removed therefrom to obtain phenoxy resin (EP-10) with a solid content of 100% by mass.

Production Example 11

Into 2-L mixer 3011 (Takabayashi rika Co., Ltd.) at an increased temperature of 140° C., was put 1.0 equivalent (939 g) of jER (registered trademark) 1007 (manufactured by Mitsubishi Chemical Corporation, bisphenol A-type epoxy resin, molecular weight: about 4060) which was then dissolved while stirring at low speed. After dissolution, 0.95 equivalents (56.3 g) of bisphenol S (molecular weight: 250) was added thereto in four parts, followed by stirring, while maintaining 140° C., at rotational speed of 30 rpm until bisphenol S was dissolved. After dissolution of bisphenol S was visually confirmed, 3.8 g of triphenylphosphine was added thereto, followed by stirring for 45 minutes under conditions where temperature was 140° C. and rotational speed was 30 rpm to obtain resin composition (EP-11) with a solid content of 100% by mass.

Production Example 12

Into 2-L mixer 3011 (Takabayashi rika Co., Ltd.) at an increased temperature of 140° C., was put 1.0 equivalent (939 g) of jER (registered trademark) 1007 (manufactured by Mitsubishi Chemical Corporation, bisphenol A-type epoxy resin, molecular weight: about 4060) which was then dissolved while stirring at low speed. After dissolution, 1.0 equivalent (57.5 g) of bisphenol S (molecular weight: 250) was added thereto in four parts, followed by stirring, while maintaining 140° C., at rotational speed of 30 rpm until bisphenol S was dissolved. After dissolution of bisphenol S was visually confirmed, 3.8 g of triphenylphosphine was added thereto, followed by stirring for 80 minutes under conditions where temperature was 160° C. and rotational speed was 30 rpm to obtain resin composition (EP-12) with a solid content of 100% by mass.

Production Example 13

Into a reaction device equipped with a stirrer, a reflux condenser, a gas introduction tube, and a thermometer, were put 1.0 equivalent (203 g) of jER (registered trademark) 1007 (manufactured by Mitsubishi Chemical Corporation, bisphenol A-type epoxy resin, molecular weight: about 4060), 0.5 equivalents (6.3 g) of bisphenol S (molecular weight: 250), 0.5 equivalents (5.2 g) of BRG-555 (manufactured by Aica Kogyo Company, Limited, novolac-based phenol resin), 0.8 g of triphenylphosphine, and 400 g of cyclohexanone, and the temperature was increased to 170° C. in a nitrogen atmosphere to cause a reaction. After reaction of 6.5 hours, disappearance of the peak originating from bisphenol S was confirmed by GPC, the reaction was terminated to obtain a phenoxy resin with a solid content of 35% by mass. The solvent was removed therefrom to obtain phenoxy resin (EP-13) with a solid content of 100% by mass.

Examples 1-8 and Comparative Examples 1-5

Production of Welding Film

Non-adhesive fluororesin films (NITOFLON (registered trademark) No. 900UL, manufactured by Nitto Denko Corporation) were placed on an upper plate and a lower plate of a pressing machine, the resin composition or the phenoxy resin obtained from each of Production Examples 1 to 13 is placed on the non-adhesive fluororesin film on the lower plate, the pressing machine was then heated to 160° C., and the resin composition or the phenoxy resin was subjected to thermocompression for 2 hours to produce a welding film with a thickness of 50 µm. The following evaluations were carried out using the obtained welding films. Results are shown in Table 1.

Evaluation (1) Shape Retainability of Welding Film

Evaluation was made as follows: those capable of being shaped into welding films were rated as "A," those providing welding films which were slightly brittle but could be demolded were rated as "B," those unable to be demolded as welding films were rated as "C."
(2) Molecular Weight Measurement (Mz, Mn, Mw)

Each of the welding films produced in Examples and Comparative Examples was dissolved in tetrahydrofuran and measured under the following conditions using Prominence 501 (manufactured by SHOWA SCIENCE CO., LTD., Detector: Shodex (registered trademark) R1-501 (manufactured by Showa Denko K.K.)).

Column: two columns LF-804 manufactured by Showa Denko K.K.
Column temperature: 40° C.
Sample: 0.4 mass % tetrahydrofuran solution of polymer
Flow rate: 1 ml/minute
Eluting solution: tetrahydrofuran (3) Thickness of Welding Film The thickness of each of the obtained welding films was measured using MDC-25MX manufactured by Mitutoyo Corporation after the films were left in an atmosphere with humidity of 50% at 23° C. for 24 hours.

(4) Tensile Share Test

Production of Joining Test Body 1 (Steel Plate/Welding Film/Steel Plate)

After a surface of a cold-rolled steel plate with a size of 25 mm×100 mm and a thickness of 3 mm was subjected to a blasting treatment for ten minutes, the blast surface was defatted with methyl ethyl ketone. The welding film was placed on the defatted surface, and a cold-rolled steel plate having been subjected to the same treatment was superimposed thereon so that the overlapping length and width at the joined part were 12.5 mm and 25 mm, respectively, and held by a clip. Joining test body 1 was produced by leaving for two hours to weld, in the held state, in an atmosphere at 160° C. The joined part herein means the portion on which the test body base material was superposed.

Production of Joining Test Body 2 (Aluminum/Welding Film/Aluminum)

Joining test body 2 was produced in the same manner as the production of joining test body 1 described above except that aluminum A6061-T6 with a size of 25 mm×100 mm and a thickness of 1.6 mm was used instead of cold-rolled steel plates.

Production of Joining Test Body 3 (Aluminum/Welding Film/Polycarbonate)

Polycarbonate 121R (manufactured by SABIC) was injection-molded under conditions where cylinder temperature was 290° C., mold temperature was 85° C., injection speed was 30 mm/second, pressure was kept at 70 MPa for 3 seconds and at 50 MPa for 2 seconds, and cooling time was 13 seconds, using an injection molding machine (manufactured by Sumitomo Heavy Industries, Ltd., SE100V) to obtain a polycarbonate plate with a size of 25 mm×100 mm and a thickness of 2 mm.

The obtained polycarbonate plate and an aluminum plate were prepared as test body base materials. The aluminum plate was obtained by subjecting, to a blasting treatment, a surface of aluminum A6061-T6 with a size of 25 mm×100 mm and a thickness of 1.6 mm for 10 minutes, and then defatting the blast surface with methyl ethyl ketone.

The welding film was placed on the defatted surface of the aluminum plate, and polycarbonate plate was superimposed thereon so that the overlapping length and width at the joined part were 12.5 mm and 25 mm, respectively, and fixed, the fixed part was subjected to high-frequency induction using a high-frequency induction welding machine (manufactured by SEIDENSHA ELECTRONICS CO., LTD, oscillator UH-2.5K, press JIIP30S) to cause the metal to generate heat, and the aluminum plate and the polycarbonate plate were joined by heating and pressurization to produce joining test body 3. The pressurization force was set to 110 N (pressure: 2.2 MPa), the oscillating frequency was set to 900 kHz, and the oscillating time was set to 5 seconds.

A tensile shear strength test was conducted on each joining test body with a tensile tester (manufactured by SHIMADZU CORPORATION, Universal Testing Machine Autograph "AG-IS"; load cell: 10 kN, tensile speed: 10 mm/min, temperature: 23° C., 50% RH) in accordance with JIS K 6850:1999 to measure joining strength. Measurement results are shown in Table 1.

TABLE 1

| | | Unit | Example 1 | Example 2 | Example 3 | Example 4 | Example 5 | Example 6 | Example 7 | Example 8 |
|---|---|---|---|---|---|---|---|---|---|---|
| Resin composition or phenoxy resin | | — | EP-1 | EP-2 | EP-3 | EP-4 | EP-5 | EP-7 | EP-11 | EP-12 |
| Number average molecular weight (Mn) | | — | 17,139 | 14,302 | 9,765 | 11,812 | 6,196 | 13,898 | 18,532 | 20,521 |
| Weight average molecular weight (Mw) | | — | 56,730 | 70,665 | 34,274 | 81,085 | 26,207 | 35,689 | 110,202 | 120,105 |
| Z average molecular weight (Mz) | | | 144,975 | 208,991 | 81,202 | 270,146 | 152,441 | 72,372 | 387,364 | 588,921 |
| Ratio (Mz/Mn) | | — | 8.5 | 14.6 | 8.3 | 22.9 | 24.6 | 5.2 | 20.9 | 28.7 |
| Welding film shape retainability | | — | A | A | A | A | B | A | A | B |
| Welding film thickness | | μm | 75 | 97 | 153 | 53 | 45 | 30 | 482 | 553 |
| Tensile shear strength | Joining test body 1 | MPa | 16.2 | 17.0 | 16.9 | 13.5 | 10.5 | 11.0 | 12.2 | 10.5 |
| | Joining test body 2 | MPa | 17.4 | 17.4 | 12.2 | 10.7 | 17.2 | 13.5 | 16.8 | 12.2 |
| | Joining test body 3 | MPa | 26.0 | 22.0 | 18.2 | 23.8 | 19.8 | 21.0 | 20.8 | 15.8 |

| | | Unit | Comparative Example 1 | Comparative Example 2 | Comparative Example 3 | Comparative Example 4 | Comparative Example 5 |
|---|---|---|---|---|---|---|---|
| | Resin composition or phenoxy resin | — | EP-8 | EP-9 | EP-10 | EP-6 | EP-13 |
| | Number average molecular weight (Mn) | — | 5,815 | 9,426 | 8,851 | 8,121 | 14,900 |
| | Weight average molecular weight (Mw) | — | 13,910 | 20,165 | 26,913 | 23,400 | 31,800 |

TABLE 1-continued

|  |  |  |  |  |  |  |  |
|---|---|---|---|---|---|---|---|
| Z average molecular weight (Mz) |  |  | — | 25,920 | 35,786 | 49,483 | 48,497 | 70,021 |
| Ratio (Mz/Mn) |  |  | — | 4.5 | 3.8 | 5.6 | 6.0 | 4.7 |
| Welding film shape retainability |  |  | — | C | B | B | C | A |
| Welding film thickness |  |  | μm | −*1 | 108 | 94 | −*1 | 702 |
| Tensile shear strength | Joining test body 1 |  | MPa | −*1 | 8.0 | 9.8 | −*1 | 2.4 |
|  | Joining test body 2 |  | MPa | −*1 | 9.0 | 8.3 | −*1 | 3.3 |
|  | Joining test body 3 |  | MPa | −*1 | 15.2 | 16.0 | −*1 | 4.8 |

*1: Evaluation was impossible

It is revealed that since Examples 1 to 8 in which welding films each formed from a phenoxy resin having a Mz of 70,000 or more and a ratio [Mz/Mn] of 5.0 or more were used have strength enough to be released from a mold and thus are excellent in handling properties, have high tensile shear strength of 10 MPa or more, and are excellent in welding strength.

INDUSTRIAL APPLICABILITY

Joined bodies using the welding film according to the present embodiment are used, for example, as automobile components, such as a door side panel, an engine hood roof, a tailgate, a steering hanger, an A pillar, a B pillar, a C pillar, a D pillar, a crush box, a power control unit (PCU) housing, an electric compressor component (such as an inner wall, an intake port, an exhaust control valve (ECV) insertion part, and a mount boss), a lithium ion battery (LIB) spacer, a battery case, and an LED head lamp, and as structural members of a smartphone, a notebook personal computer, a tablet personal computer, a smartwatch, a large size liquid crystal display television set (LCD-TV), and an outdoor LED illumination, but are not particularly limited to these exemplified applications.

REFERENCE SIGNS LIST

10: Joined body
1: Welding film
2: First base material
3: Second base material

The invention claimed is:

1. A welding film comprising a phenoxy resin, wherein a z average molecular weight of the phenoxy resin is 70,000 or more, and a ratio [Mz/Mn] between the z average molecular weight and a number average molecular weight of the phenoxy resin is 5.0 or more,
wherein the phenoxy resin contains no structural units derived from a bisphenol F resin.

2. The welding film according to claim 1, wherein a thickness of the welding film is 1 to 1000 μm.

3. The welding film according to claim 1, wherein tensile shear strength obtained in a test in accordance with JIS K 6850:1999 when the welding film is welded between a first base material and a second base material is 10 MPa or more.

4. A joined body obtained by welding the welding film according to claim 1 between a first base material and a second base material.

5. The joined body according to claim 4, wherein the first base material and the second base material each include at least one kind selected from aluminum, iron, fiber reinforced plastic, glass, a ceramic, a polypropylene, a polycarbonate, a polymethyl methacrylate, a polyetherimide, a polyamide, and a polybutylene terephthalate.

6. A method of producing the joined body according to claim 5, the method comprising welding the welding film between the first base material and the second base material by at least one method selected from the group consisting of heating, hot-pressing, ultrasonic welding, and high-frequency induction welding.

7. The joined body according to claim 4, wherein the phenoxy resin consists of repeating units formed by a reaction of a bifunctional epoxy compound and a bifunctional hydroxyl group-containing compound, the bifunctional epoxy compound being selected from the group consisting of a bisphenol A epoxy resin, a bisphenol S epoxy resin, a biphenol epoxy resin, a naphthalene bifunctional epoxy resin, and 1,6-hexanediol diglycidyl ether, and the bifunctional hydroxyl group-containing compound being selected from the group consisting of bisphenol A, bisphenol S, a biphenol, ethylene glycol, propylene glycol, and diethylene glycol.

8. The joined body according to claim 7, wherein the bifunctional epoxy compound is a bisphenol A epoxy resin and the bifunctional hydroxyl group-containing compound is selected from the group consisting of bisphenol A and bisphenol S.

9. The joined body according to claim 8, wherein the bifunctional hydroxyl group-containing compound is bisphenol S.

10. The joined body according to claim 8, wherein the bisphenol A epoxy resin has a molecular weight of 250 to 6,000.

11. The joined body according to claim 10, wherein the bisphenol A epoxy resin has a molecular weight of 300 to 6,000.

12. The joined body according to claim 11, wherein the bisphenol A epoxy resin has a molecular weight of 700 to 5,000.

13. The joined body according to claim 9, wherein the bisphenol A epoxy resin has a molecular weight of 250 to 6,000.

14. The joined body according to claim 13, wherein the bisphenol A epoxy resin has a molecular weight of 300 to 6,000.

15. The joined body according to claim 14, wherein the bisphenol A epoxy resin has a molecular weight of 700 to 5,000.

16. The joined body according to claim 1, wherein the z average molecular weight of the phenoxy resin is 70,000 to 800,000.

17. The joined body according to claim 16, wherein the z average molecular weight of the phenoxy resin is 70,000 to 600,000.

18. The joined body according to claim 17, wherein the z average molecular weight of the phenoxy resin is 70,000 to 400,000.

19. The joined body according to claim 18, wherein the z average molecular weight of the phenoxy resin is 80,000 to 250,000.

* * * * *